United States Patent
Rychlewski et al.

(10) Patent No.: US 11,379,657 B2
(45) Date of Patent: *Jul. 5, 2022

(54) SYSTEMS AND METHODS FOR AUTOMATIC REPORT GENERATION AND RETAINING OF ANNOTATIONS IN REPORTING DOCUMENTS AFTER REGENERATION

(71) Applicant: The Toronto-Dominion Bank, Toronto (CA)

(72) Inventors: Gregory Victor David Rychlewski, Toronto (CA); Jingang Liu, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,613

(22) Filed: Sep. 8, 2020

(65) Prior Publication Data

US 2020/0401762 A1    Dec. 24, 2020

Related U.S. Application Data

(63) Continuation of application No. 16/139,964, filed on Sep. 24, 2018, now Pat. No. 10,803,239.

(51) Int. Cl.
*G06F 17/00* (2019.01)
*G06F 40/186* (2020.01)
(Continued)

(52) U.S. Cl.
CPC .......... *G06F 40/186* (2020.01); *G06F 16/338* (2019.01); *G06F 16/34* (2019.01); *G06F 40/169* (2020.01)

(58) Field of Classification Search
CPC ...... G06F 40/186; G06F 16/34; G06F 16/338; G06F 40/169; G16H 10/60; G16H 15/00
(Continued)

(56) References Cited

U.S. PATENT DOCUMENTS 7,640,335 B1 * 12/2009 Agrawal ................. H04L 41/18
709/224
8,131,815 B1    3/2012 Perelman et al.
(Continued)

OTHER PUBLICATIONS

Non-Final Office Action issued in U.S. Appl. No. 16/139,964 dated Jan. 22, 2020, 17 pages.
(Continued)

*Primary Examiner* — Jason T Edwards
(74) *Attorney, Agent, or Firm* — Fish & Richardson P.C.

(57) ABSTRACT

The present disclosure involves systems, software, and computer implemented methods for automatically generating reporting documents based on contents of an associated set of test data. One example method includes receiving a request to generate a new report, the request identifying a report template, a set of test data, and a report name associated with the request. A repository stores the test data and report templates, each template associated with an initial set of bookmarks, each bookmark associated with a particular location. A copy of the template is generated and stored as the identified report name. Based on the test data, a set of visualizations to be inserted into the new report are identified. Bookmarks associated with each of the visualizations are inserted into the new report. Each visualization is then generated and inserted at the location of the corresponding bookmark. The updated version of the report is then stored.

20 Claims, 8 Drawing Sheets

(51) Int. Cl.
*G06F 16/34* (2019.01)
*G06F 16/338* (2019.01)
*G06F 40/169* (2020.01)

(58) Field of Classification Search
USPC ........................................................ 715/255
See application file for complete search history.

(56) References Cited

U.S. PATENT DOCUMENTS

| | | | |
|---|---|---|---|
| 9,779,063 | B1 | 10/2017 | Dykema |
| 10,268,980 | B1* | 4/2019 | Gindin ................. G06Q 10/067 |
| 2004/0059597 | A1 | 3/2004 | Tkaczyk et al. |
| 2005/0107690 | A1 | 5/2005 | Soejima |
| 2006/0004745 | A1 | 1/2006 | Kuhn et al. |
| 2006/0242201 | A1 | 10/2006 | Cobb et al. |
| 2006/0265641 | A1 | 11/2006 | Garfinkle et al. |
| 2009/0249231 | A1* | 10/2009 | Mohr ..................... G06Q 10/10 715/763 |
| 2010/0124993 | A1 | 5/2010 | Acres |
| 2010/0215272 | A1 | 8/2010 | Isaev et al. |
| 2012/0035963 | A1 | 2/2012 | Qian et al. |
| 2013/0268850 | A1 | 10/2013 | Kyprianou et al. |
| 2014/0019851 | A1 | 1/2014 | DeRoller |
| 2014/0108396 | A1 | 4/2014 | Hobbs |
| 2014/0201004 | A1 | 7/2014 | Parundekar et al. |
| 2015/0046791 | A1* | 2/2015 | Isaacson ............... G06F 40/103 715/234 |
| 2015/0277825 | A1 | 10/2015 | Isobe |
| 2018/0060535 | A1 | 3/2018 | Reicher |
| 2020/0012709 | A1* | 1/2020 | Kogler ................. G06F 40/177 |
| 2020/0097535 | A1 | 3/2020 | Rrychlewski et al. |

OTHER PUBLICATIONS

Final Office Action issued in U.S. Appl. No. 16/139,964 dated Mar. 31, 2020, 18 pages.

* cited by examiner

FIG. 5B

5.2.2 Population Stability Index (PSI)

Table 1: Population Stability Index by RWA Band

| Modelling Period - 201612 | |
|---|---|
| 200912 - 201012 | 0.00089 |
| 201012 - 201112 | 0.0211 |
| 201112 - 201212 | 0.0988 |
| 201212 - 201312 | 0.0021 |
| 201312 - 201412 | 0.0769 |
| 201412 - 201512 | 0.00754 |
| 201512 - 201612 | 0.000061 |

Table 2: Population Stability Index Breakdown by RWA Band

| Modelling Period | 201612 | Modelling Period - 201612 |
|---|---|---|
| 01 | 9.11% | 47.81% | 0.4429 |
| 02 | 12.29% | 19.13% | 0.0102 |
| 03 | 11.20% | 9.46% | 0.0163 |

FIG. 5C

SYSTEMS AND METHODS FOR AUTOMATIC REPORT GENERATION AND RETAINING OF ANNOTATIONS IN REPORTING DOCUMENTS AFTER REGENERATION

CROSS-REFERENCE TO RELATED APPLICATION

This application is a continuation of U.S. application Ser. No. 16/139,964, filed on Sep. 24, 2018. The entire disclosure of the above application is incorporated herein by reference.

TECHNICAL FIELD

The present disclosure relates to computer-implemented methods, software, and systems for automatically generating reporting documents based on contents of an associated set of test data. Additionally, annotations associated with a previously generated reporting document can be retained after portions of the reporting document are regenerated based on changes to the associated set of test data.

BACKGROUND

Current report generation tools and applications allow analysts and researchers to generate reports for use with existing data sets. In one example, analysts can manually insert data and associated visualizations into specific portions of a report and add the corresponding visualizations. Further notes and explanations can then be added manually. In another example, portions of the reporting document may be generated automatically, such as visualizations like tables and charts. The visualizations are based on an existing set of data, and can be placed into the generated reporting document based on user direction. However, if issues with the set of data are identified after further modifications to the generated reporting document are made by analysts or others, the generated visualizations must be regenerated, along with the entirety of the reporting document and any other modifications. Analyst notes or annotations associated with the prior visualizations are then erased in the newly generated reporting document, causing a significant loss in analyst time and work product, and in the completion and publication of the final version of the document.

SUMMARY

The present disclosure involves systems, software, and computer-implemented methods for automatically generating reporting documents based on contents of an associated set of test data. A first example system includes a communications module, at least one memory storing instructions and a repository storing a plurality of sets of test data and at least one report template, and at least one at least one hardware processor interoperably coupled with the at least one memory and the communications module. Each report template can be associated with an initial set of bookmarks, where each bookmark of the initial set of bookmarks is associated with a location within the corresponding report template. In the system, the instructions can instruct the at least one hardware processor to perform various operations. For example, a first signal can be received, via the communications module, the first signal comprising a request for generation of a new report received via a user interface operating on a device. The request can identify a particular report template, a particular set of test data, and a report name associated with a request for report generation. Automatically, in response to receiving the request, a copy of the particular report template can be generated as a new report and store the new report as the identified report name. Based on the particular set of test data, a set of visualizations to be inserted into the new report can be identified, where each visualization is to be associated with a new bookmark, and where each new bookmark is associated with a particular location within the new report. Each of the new bookmarks associated with one of the set of visualizations can be inserted into the new report at the particular location associated with the corresponding new bookmark. Each of the identified set of visualizations can be generated, and can then be insert at the location of the new bookmark associated with the particular generated visualization. An updated version of the new report including the generated visualizations can be stored. Then, via the communications module, a second signal comprising the updated version of the new report can be transmitted to the device.

Implementations can optionally include one or more of the following features.

In some instances, the operations may further include receiving, via the communications module, a third signal comprising a second updated version of the new report, the second updated version of the new report including at least one annotation to the updated version of the new report. The second updated version of the new report including the generated visualizations and the at least one annotation can then be stored. In some of those instances, after receiving the third signal, an indication triggering a regeneration of the updated version of the new report can be identified. Automatically and in response, a copy of the stored second updated version of the new report is generated as a regenerated new report and the regenerated new report is stored as associated with a regenerated report name. Each of the visualizations generated for the updated version of the new report can be removed from the second updated version of the new report without removing any of the at least one annotations from the second updated version of the new report. Each of the visualizations can then be regenerated based on a current version of the set of test data, and each of the regenerated visualizations can be inserted into the regenerated new report at the location of the new bookmark associated with the particular generated visualization. The regenerated new report including the regenerated visualizations and the at least one annotations can be stored. A fourth signal comprising the updated version of the new report can be transmitted to the device.

In some of those instances, identifying the indication triggering a regeneration of the updated version of the new report is based on a dynamic determination that the identified set of test data is updated. In other of those instances, identifying the indication triggering a regeneration of the updated version of the new report is based on receiving an indication via the user interface from a user to regenerate the new report.

In some instances, the visualizations may include at least one of an image, a chart, a graph, or a picture.

In some instances, inserting each of the new bookmarks into the new report at the particular location associated with the corresponding new bookmark is performed by a first application or script, and generating each of the visualizations may be performed by a second application or script different than the first application or script. In some of those instances, the first application or script comprises a Visual Basic script, and the second application or script comprises R language.

In some instances, identifying, based on the particular set of test data, the set of bookmarks and associated visualizations to be inserted into the new report is based at least in part on a name of a file storing the particular set of test data.

In some instances, identifying, based on the particular set of test data, the set of bookmarks and associated visualizations to be inserted into the new report is based at least in part on an analysis of a set of particular columns included in the particular set of test data.

In some instances, the particular location at which a particular identified bookmark is inserted is based on a location relative to at least one of the initial set of bookmarks in the particular identified report template.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 5A-C illustrate example screenshots of a report template and two example reports in one implementation.

DETAILED DESCRIPTION

Figure 1:
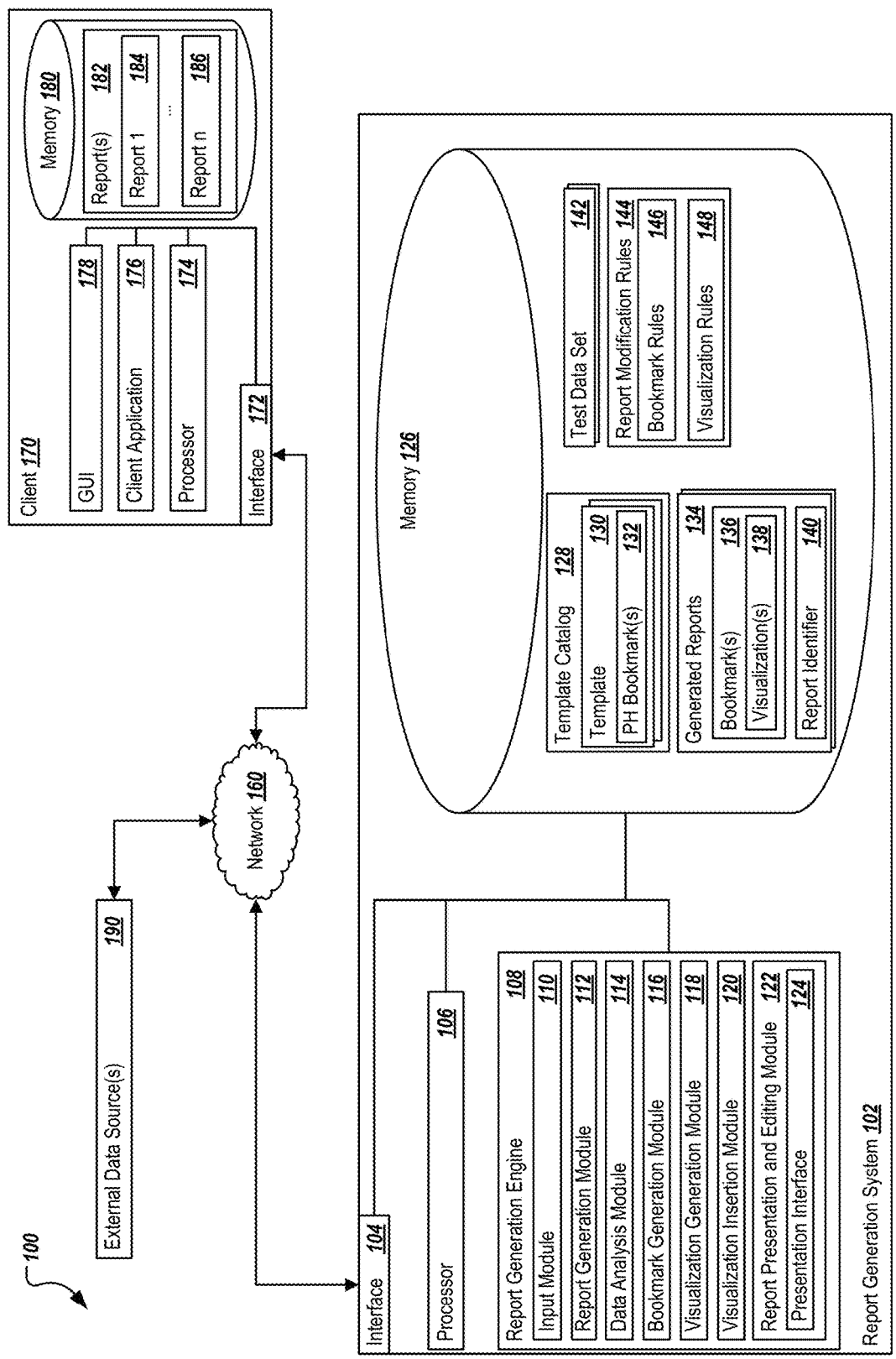
FIG. 1 is a block diagram illustrating an example system for automatically generating reporting documents based on contents of an associated set of test data.

The present disclosure describes various tools and techniques associated with automatically generating reporting documents based on contents of an associated set of test data. Additionally, annotations associated with a previously generated reporting document can be retained after portions of the reporting document are regenerated based on changes to the associated set of test data. In particular, methods and solutions are provided to ensure that reporting documents can be generated in a first instance in an automatic manner, where the data sets selected by a user or analyst can be determinative of the particular visualizations to be input into a report template. Further, when a first reporting document is generated, analysts are able to annotate and edit the document by adding additional insights and comments to the added visualizations. However, in some instances, issues with the underlying data set may cause revisions to the visualizations to need to be made. In prior solutions, revising the underlying data would require the report to regenerate from scratch, losing all annotations in the process as all of the report is reproduced. However, in the current solution, the existing report can be used as a new template for the revised report, such that any annotations added to the existing report can be saved and maintained. The regeneration process for the revised report can affect only the visualizations as generated from the revised data set, and any corresponding text and comments will be included in the second report generated during the regeneration process. Where previous regenerations could take hours, days, and weeks to recreate the work already done, the present solution allows regenerations to be completed in seconds or minutes, without the need to provide new or revised annotations. Further, and more generally, by allowing the data set to be determinative as to the particular visualizations to be included in the generated report, additional clarity and uniformity can be obtained for reports across an organization, allowing any user to generate a report instantly recognizable to those associated with the report and data types.

One implementation of the present solution may be used in an enterprise risk management solution, where model validation and testing may be used. To perform that validation, analysts may need to create documentation to review and analyze current risk scenarios. To do so, similar reports may be generated every week, every other week, every month, or at any periodic interval or in response to particular events. The initial reports can be generated based on a report template, and the visualizations included in a particular report can include charts, graphs, and other visual aids used to relate underlying data to readers. The visualizations generated can be derived from detailed sets of data already calculated and available, and can be used by the analysts to include particular visualizations to include in the report.

In some instances, an R application may be used to generate the visualizations. R is a language and environment for statistical computing and graphs. R provides a wide variety of statistical (linear and nonlinear modeling, classical statistical tests, time-series analysis, classification, clustering, etc.) and graphical techniques. One of R's strengths, in particular, is the ease with which well-designed publication-quality plots can be produced, including mathematical symbols and formulas. The back end data sets, which may be represented as models or other suitable data sets, can be used to generate particular graphs and charts in the R application.

Using the R application and the report template (for example, a Microsoft Word document), the R application can analyze a selected data set (e.g., that is selected via a user interface or input screen, or a default data set associated with a particular report template, user, or group) and determine, based on one or more visualization rules and the selected data set, a set of visualizations to be generated for the report. The report template itself may initially include one or more bookmarks. The bookmarks may be any indication included within a text-based document (e.g., the Microsoft Word document) that associates or identifies a particular location or position in a document with a particular name. Any number of bookmarks can be added to a text-based document. In one implementation, a script or other suitable executable function, including a macro associated with the document itself, may identify the particular bookmarks to be added to or removed from a report to be generated. Each bookmark can be associated with a particular visualization to be inserted into the text-based document. Once the R application, for example, generates the visualization, then those visualizations can be placed at the particular locations within the text-based document where their corresponding bookmarks are located.

In some instances, a first program or application may cause a report to be generated from a report template. A second program or application can analyze the selected data set to determine the visualizations to be inserted and identify the bookmarks to be included in the document. A third program or application can insert the bookmarks into the report template, and a fourth program or application can generate the visualizations and insert them at the appropriate bookmarks. In other instances, any number of programs or applications may be used to perform the actions and processes described herein, including a single program or application, two programs or applications, or n programs or applications. No restriction is intended by the description of particular implementations herein. Further, in some instances, code or scripting, such as a Visual Basic for Applications (VBA) script or code, can be embedded in or associated with the report template or generated report. The embedded code or scripting can receive information from the analysis of the selected data set, and can determine or identify where particular bookmarks are to be placed, and can insert them at those locations.

As noted, once the initial report is generated from the report template and the analysis of the data set to be used, the report can be modified through a user interface, either locally or remotely (e.g., via a web interface). Modification can be to change particular portions of the report, including adding annotations. In some instances, a user, analyst, or admin may determine a change to the data set used to generate the visualizations and report. In such instances, the existing report can be saved, and can then be used as the template for a revised report. In generating the second, or revised report, the bookmarks and the visualizations associated with the first report may be removed, and the new set of data can be reanalyzed. However, any annotations and additions to the first report outside of the bookmarks/visualizations can be maintained and kept. The regeneration process can be performed again to identify the locations of the bookmarks associated with the visualizations to be generated, and the visualizations can be generated and inserted into the updated second report. By doing so, a revised report can be automatically generated without causing any loss of annotations added to the prior version of the report.

Turning to the illustrated example implementation, FIG. 1 is a block diagram illustrating an example system 100 for automatically generating reporting documents based on contents of an associated set of test data. System 100 also provides tools for automatically regenerating a revised reporting document based on a modified set of test data while retaining any annotations or modifications performed on an initial reporting document. In general, the system 100 allows the illustrated components to share and communicate information across devices and systems (e.g., report generation system 102, client 170, and external data sources 190, among others, via network 160). As described herein, the report generation system 102 may be a cloud-based component or system, while in other instances, non-cloud systems may be used. In some instances, non-cloud-based systems, such as on-premise systems, client-server applications, and applications running on one or more client devices, as well as combinations thereof, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, report generation system 102 and client 170 may be any computer or processing device such as, for example, a blade server, general-purpose personal computer (PC), Mac®, workstation, UNIX-based workstation, or any other suitable device. Moreover, although FIG. 1 illustrates a single report generation system 102, the system 102 can be implemented using a single system or more than those illustrated, as well as computers other than servers, including a server pool. In other words, the present disclosure contemplates computers other than general purpose computers, as well as computers without conventional operating systems. Similarly, the client 170 may be any system which can request data and/or interact with the report generation system 102. The client device 170, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™ among others. The client 170 may include one or more specific applications executing on the client 170, or the client 170 may include one or more Web browsers or web applications that can interact with particular applications executing remotely from the client 170, such as the report generation engine 108 and its external interfaces, such as the presentation interface 124.

The report generation system 102 may be associated with the one or more cloud-based applications or platforms, and may be associated with or a part of a cloud platform. As illustrated, the report generation system 102 includes or is associated with interface 104, processor(s) 106, the report generation engine 108, and memory 126. The interface 104 is used by the report generation system 102 for communicating with other systems in a distributed environment—including within the environment 100—connected to the network 160, e.g., client 170 and the external data source(s) 190, and other systems communicably coupled to the illustrated report generation system 102 and/or network 160. Generally, the interface 104 comprises logic encoded in software and/or hardware in a suitable combination and operable to communicate with the network 160 and other components. More specifically, the interface 104 may comprise software supporting one or more communication protocols associated with communications such that the network 160 and/or interface's hardware is operable to communicate physical signals within and outside of the illustrated environment 100. Still further, the interface 104 may allow the report generation system 102 to communicate with the client 170 in response to specific requests to generate one or more reports 134 from particular report templates 130 and associated with particular test data sets 142, and can analysis how the report templates 130 are to be generated based on one or more report modification rules 144, as described herein.

Network 160 facilitates wireless or wireline communications between the components of the environment 100 (e.g., between the report generation system 102, the client(s) 170, and any external data sources 190), as well as with any other local or remote computers, such as additional mobile devices, clients, servers, or other devices communicably coupled to network 160, including those not illustrated in FIG. 1. In the illustrated environment, the network 160 is depicted as a single network, but may be comprised of more than one network without departing from the scope of this disclosure, so long as at least a portion of the network 160 may facilitate communications between senders and recipients. In some instances, one or more of the illustrated components (e.g., the report generation system 102) may be included within or deployed to network 160 or a portion thereof as one or more cloud-based services or operations. The network 160 may be all or a portion of an enterprise or secured network, while in another instance, at least a portion of the network 160 may represent a connection to the Internet. In some instances, a portion of the network 160 may be a virtual private network (VPN). Further, all or a portion of the network 160 can comprise either a wireline or wireless link. Example wireless links may include 802.11a/b/g/n/ac, 802.20, WiMax, LTE, and/or any other appropriate wireless link. In other words, the network 160 encompasses any internal or external network, networks, sub-network, or combination thereof operable to facilitate communications between various computing components inside and outside the illustrated environment 100. The network 160 may communicate, for example, Internet Protocol (IP) packets, Frame Relay frames, Asynchronous Transfer Mode (ATM) cells, voice, video, data, and other suitable information between network addresses. The network 160 may also include one or more local area networks (LANs), radio access networks (RANs), metropolitan area networks (MANs), wide area networks (WANs), all or a portion of the Internet, and/or any other communication system or systems at one or more locations.

The report generation system 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the report generation system 102. Specifically, the processor 106 executes the algorithms and operations described in the illustrated figures, as well as the various software modules and functionality, including the functionality for sending communications to and receiving transmissions from clients 170, as well as to other devices and systems. Each processor 106 may have a single or multiple core, with each core available to host and execute an individual processing thread. Further, the number of, types of, and particular processors 106 used to execute the operations described herein may be dynamically determined based on a number of requests, interactions, and operations associated with the report generation system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The report generation system 102 can include, among other components, several applications, entities, programs, agents, or other software or similar components capable of performing the operations described herein. As illustrated, the report generation system 102 includes an input module 110, a report generation module 112, a data analysis module 114, a bookmark generation module 116, a visualization generation module 118, a visualization insertion module 120, and a report presentation and editing module 122. These components combine to perform the operations associated with the report generation system 102, although alternative, additional, or combined components may perform the operations in other instances or implementations. Specifically, one or more programs, applications, or other components may perform combinations of the functionality described herein, and are not meant to require separate or disparate components. In some instances, some or all of the report generation engine 108 may be performed by or associated with one or more R applications. In some instances, a portion of the described report generation engine 108 may be code or scripting inserted into a particular generated report 134, which can use that code or scripting to complete the corresponding report's generation or modifications. Further, while the functionality of the report generation engine 108 is described separately, multiple functions may be combined and performed by a single component, while other functions may be separated and performed by two or more components, where those separate functions may be performed individually or in combination with one another.

The input module 110 of the report generation engine 108 can receive an initial set of input related to report generation. In some instances, the input module 110 may be associated with a presentation interface 124 of the report presentation and editing module 122, where a set of fields or inputs are made available for users (e.g., analysts) to input information to trigger the generation of one or more reports. In one instance, the input module 110 may request and/or receive information identifying a particular report template 130 (from a template catalog 128) to base the report to be generated on, a particular set of test data 142 to be used to generate the report, and a name or identifier 140 to be associated with the to-be generated report. The input module 110 can pass the information to the report generation module 112.

The report generation module 112 can perform operations associated with copying the identified template 130 as a new generated report 134. Once copied, the report generation module 112 can apply the report identifier 140 to the generated report 134. As illustrated, each of the templates 130 may include one or more placeholder bookmarks 132 at different locations within the template 130. Those placeholder bookmarks 132 are copied to and are initially stored in the generated report 134.

Once the report 134 is generated, the selected set of test data 142 identified by the input can be analyzed by the data analysis module 114 to determine one or more visualizations and their associated bookmarks to be generated. The determination can be based on one or more report modification rules 144, where the report modification rules 144 are based, at least in part, on the type, content, and context of the set of test data 142 identified for the particular report to be generated. The data analysis module 114 can analyze the specific data set 142 and compare that data set 142 against the report modification rules 144. In some instances, a name or title of the data set 142 may identify the data included in the data set 142, and can identify one or more visualizations 138 to be generated in the report. Additionally, the particular columns or fields included in tables or results included in the data set 142 may be used by the data analysis module 114 to determine one or more visualizations to be generated. In some instances, the specific visualizations to be generated can be dynamic combinations of any set of visualizations, such as where certain columns or combinations of columns can trigger one or more visualizations, while the title of a set of test data 142 may trigger or identify a different one or more visualizations. The data analysis module 114, upon determining the specific visualizations, can pass the information to a bookmark generation module 116 and the visualization generation module 118.

In one implementation, the name of the dataset is used to determine what types and kinds of tests were performed. The type of test performed is used by data analysis module 114 to determine a general structure of the graphs and/or tables to be included. The general structure of those graphs and tables can be discussed and modified by the programmer and managers, and designed in accordance with any appropriate preferences. The structure can be modified in response to business or personal needs and preferences. Further, each test may be performed multiple times for different portions of the raw data (e.g., if the customers are separated into segments, such as persons who are late in their monthly payments vs. persons who pay the bills on time, etc.). There may be columns inside the data set that can be used to identify how many different times the test was performed, as well as the corresponding portion of the raw data it was performed on. The combination of test name and subgroup of the population can be used to create a name of the bookmark.

The bookmark generation module 116 may be part of the report generation engine 108 as illustrated, or may be included in or associated with the generated report 134 itself. Each visualization to be generated and added to the report 134 may be associated with an identifier, such as where the identifier corresponds to, is derived from, or is mapped to one or more of the placeholder bookmarks 132 included in the generated report 134. Based on the name or identifier of the visualizations to be generated and included, the bookmark generation module 116 can match or identify where in the generated report 134 the bookmarks corresponding to the visualizations to be generated should be placed. For example, one section of the template 130 may be related to information on a Population Stability Index (PSI). An existing bookmark in the generated report 134 may be identified or named as "psi_sec". Based on the data in the selected test data set 142, a determination that a Population Stability Index by RWA Band visualization (entitled "psiRB") and a Population Stability Index Breakdown by RWA Band (entitled "psidRB") can be identified as visualizations to be added to the report 134. The bookmark generation module 116, using the bookmark rules 146 identifying how bookmarks are generated and are associated with the visualizations to be generated, can identify the particular locations in the report 134 relative to the existing bookmarks 132 of similar or corresponding names. Based on the prefix of "psi_sec", the bookmarks related to the visualizations "psiRB" and "psidRB" can be associated with the bookmark "psi_sec". The bookmark generation module 116 can then, during the generation process, insert the corresponding bookmarks at locations just after the "psi_sec" bookmark. Similar determinations can be made for each of the visualizations to be generated, with their respective bookmarks identified and matched to existing bookmarks to determine where those bookmarks should be located and inserted. In some instances, alternative methods of bookmark placement can be used.

In some instances, the location of the bookmark or the location at which the bookmark is to be placed can be determined in a number of ways or based on different determinations. In one instance, each test may be associated with its own section in the template. The title of that section can be given its own bookmark that can be used as an indicator that all graphs and tables for this test should be placed there, or relative to there. The order that the graphs and tables are placed under this section can be set up by default (e.g., in bookmark rules 146), or may be specifically defined. Users and programmers may have the option to override the default order by providing a specified or preferred order. In a second option, some bookmark placements may be based on other bookmarks generated by the program. For example, if one test has a graph and a table associated with it, the program may first make the graph bookmark as described above, and then, when making the table bookmark, can identify the graph bookmark and place the table bookmark underneath it.

Once the bookmarks 136 are identified and inserted into the report 134, or while those bookmarks 136 are being determined, the visualization generation module 118 can identify, as inputs, the relevant portions of the set of test data 142 associated with the visualizations to be generated. Each of the visualizations to be generated are associated with a predetermined visualization generation algorithm or definition. That definition may be defined in the visualization rules 148, and can be applied to generate the corresponding visualization 138, which may include a chart, table, video, or other object associated with the visualization. The generated visualization 138 may be any suitable file, including an image file, a video file, and a moving image file (e.g., a GIF, a PNG file, etc.). The generated visualizations 138 may, in some instances, be stored separate from the report 134 for external access to the visualization 138, or may be generated and inserted at the location corresponding to the related bookmark 136. The insertion of the visualization 138 at the particular bookmark 136 can be performed by a visualization insertion module 120. In some cases, the visualization insertion module 120 may identify a name of the generated visualization 138 and can associate the visualization 138 to a particular bookmark 136 based on the bookmark's corresponding name or identifier. Based on the match or association, the visualization 138 can be placed in the correct location at the corresponding bookmark 136 of the generated report 134. In some instances the visualization insertion module 120, or another suitable component or functionality, can perform an additional function of identifying placeholder bookmarks 132 remaining in the generated report 134, but that are not associated with inserted bookmarks 136 and corresponding visualizations 138. In those instances, where no data may be related to a portion of the template 130, the placeholder bookmark 132 and any corresponding header or section may be removed from the generated report 134, thereby avoiding an empty or unused section or portion of the template 130.

Once generated and all visualizations 138 are inserted into the generated report 134, the report 134 can be saved or persisted to memory 126, and made available to one or more users or analysts, such as those associated with client 170. The report presentation and editing module 122 of the report generation engine 108 can be used to provide the generated report 134 to interested persons and entities and to manage any revisions or additions (e.g., notations) to the generated report 134. In some instances, a presentation interface 124 may be provided where the presentation is via a web page or client application 176. The presentation interface 124 can send, transmit, or make available the generated report 134 to authorized users. The generated report 134 may be provided as an editable document, so that one or more authorized users can annotate and otherwise modify the contents of the generated report 134. The annotations, for example, can be used to provide comments on the data, additional insight into particular results, or any suitable commentary or addition. As illustrated, the presentation interface 124 may provide the generated report 134 to an authorized user via client application 176 and/or GUI 178.

Memory 126 of the report generation system 102 may represent a single memory or multiple memories. The memory 126 may include any memory or database module and may take the form of volatile or non-volatile memory including, without limitation, magnetic media, optical media, random access memory (RAM), read-only memory (ROM), removable media, or any other suitable local or remote memory component. The memory 126 may store various objects or data, including financial data, user information, administrative settings, password information, caches, applications, backup data, repositories storing business and/or dynamic information, and any other appropriate information associated with the report generation system 102, including any parameters, variables, algorithms, instructions, rules, constraints, or references thereto. Additionally, the memory 126 may store any other appropriate data, such as VPN applications, firmware logs and policies, firewall policies, a security or access log, print or other reporting files, as well as others. While illustrated within the report generation system 102, memory 126 or any portion thereof, including some or all of the particular illustrated components, may be located remote from the report generation system 102 in some instances, including as a cloud application or repository, or as a separate cloud application or repository when the report generation system 102 itself is a cloud-based system.

As illustrated and previously described, memory 126 includes a template catalog 128, including one or more templates 130 which may be selected as the basis for a report generation process. Further, one or more generated reports 134 may be stored in memory 126. One or more sets of test data 142, which may be the basis of the visualization generation and placement process, can be stored in or referenced by memory 126. Additionally, the test data sets 142 may be stored remote from memory 126 (e.g., at one or more external or remote data sources 190, where test data may be stored and/or generated), and made available from a remote location accessible via network 160. In some instances, where the report generation process is performed at a client 170, the test data set 142 may be stored in a memory local to the client 170, or may be accessible at generation time to the client 170 from a remote location. Memory 126 also stores the report modification rules 144, which define a determination of one or more visualizations 138 to be generated based on the data included in or the format of the test data set 142 (defined by visualization rules 148), and a set of rules (e.g., bookmark rules 146) identifying how bookmarks associated with those visualizations should be generated, named, and/or placed within the corresponding generated report 134.

Once a report 134 has been generated and annotations added, the underlying set of data 142 associated with the report 134 may be identified either as having an issue (e.g., incorrect calculations in the data 142), or may be determined to be out of date if new data is available. In such situations, the report generation engine 108 can perform an alternative process for report regeneration, where the alternative process allows any of the annotations, placed near or around particular visualizations 138, to be maintained, even where the visualizations 138 and corresponding bookmarks 136 are removed and replaced with an updated set of visualizations 138 and corresponding bookmarks 136 based on a new or revised set of data.

To begin the regeneration process, an indication to regenerate can be received or identified by the report generation engine 108. In some instances, the indication may be based on interaction with a particular button or UI element included in the presentation of the generated report 134. In some instances, the indication may be based not on an indication received from user input, but instead from a dynamic determination that the set of test data 142 used for the underlying report 134 has been updated or changed. The dynamic regeneration process may be performed using an agent or process (not shown) monitoring the set of test data 142 to determine if changes to particular previously selected data sets 142 have been modified or updated since a prior report 134 was generated.

The regeneration process may be similar to the generation process, except that instead of a template 130 being selected, the regeneration process used the prior version of the generated report 134 as its template. In doing so, the portions of the generated report 134 being generated that are not related to the bookmarks and visualizations will be maintained. As the generation and regeneration processes do not affect the non-bookmark and non-visualization portions of the template 130 and prior version of the report 134, respectively, any additions or modifications associated with those other portions will be maintained in the new version of the generated report 134.

Similar to the generation process, the new data set 142 to be associated with the regenerated report can be identified. In some instances, a new or different set of test data 142 can be identified, such as when the updated data is provided in a separate file or location. Alternatively, if the previously selected data set 142 is simply updated, then the selection of the data set 142 may be automatic for regeneration, where the updated version of the data set 142 is used without requiring further user input or identification. In some instances, only the prior file may be used for regeneration, where the current version of the set of test data 142 is associated with an updated version of the prior, or previously-used, file of test data 142.

Additionally, a name or identifier associated with the regenerated report can be identified. The name or identifier may use the previous identifier 140 as a prefix for the regenerated identifier, with a version or date appended to the end of the identifier 140 for a unique identification of the regenerated report. In other words, a new name or identifier may be provided, identified, or otherwise determined for the regenerated report. Once the information is received, the previously generated report 134 can be copied and saved or associated with the new identifier 140.

Once the new version of the generated report is saved, the report generation process can be performed by the report generation engine 108 in a similar manner to the initial report. For example, the identified data set 142 associated with the regenerated report 134 can be analyzed to determine the set of visualizations to be generated and inserted into the new report 134. Based on that determination, a set of bookmarks corresponding to the visualizations can be identified, locations associated with them determined, and the bookmarks can be placed in the revised report 134. In some instances, existing bookmarks and visualizations may be removed from the revised report 134 prior to this, while in others, the bookmarks 136 from the prior report 134 may be used, while the visualizations 138 are regenerated and inserted into their corresponding locations at the correct bookmarks 136. In most cases, the same visualizations as in the prior version of the report 134 may be identified as associated with the data set 142. In some cases, additional or fewer visualizations may be identified, where the report regeneration process can add new bookmarks into the report 134 or remove no longer used bookmarks, where appropriate. Once the updated set of visualizations are generated and inserted into the revised report 134, the revised report 134 can be saved and presented via the report presentation and editing module 122.

In some instances, a user may accidentally, or on purpose, attempt to generate a new report with the same name and in the same directly as the previous report. When such an action is detected, the system can automatically back up the old report and add or apply a time stamp to the report name for when the backup was made. This ensures that no two files in the same folder or directory can have the same name. Without such a mechanism, the prior report would be overwritten.

As illustrated, one or more clients 170 may be present in the example system 100. Each client 170 may be associated with a request to generate and/or view one or more reports 134 by or at the report generation system 102. In some instances, one or more of the clients 170 may be associated with particular analysts reviewing and working with specific set of test data 142, and responsible for annotating and interacting with the generated reports 134. Alternatively, the clients 170 may be associated with system administrators and/or developers, where those persons define or modify existing templates 130 and/or the placeholder bookmarks 132 within. As illustrated, the client 170 may include an interface 172 for communication (similar to or different from interface 104), at least one processor 174 (similar to or different from processor 106), a client application 176, a graphical user interface (GUI) 178, and a memory 180 (similar to or different from memory 126).

The illustrated client 170 is intended to encompass any computing device such as a desktop computer, laptop/notebook computer, mobile device, smartphone, personal data assistant (PDA), tablet computing device, one or more processors within these devices, or any other suitable processing device. In general, the client 170 and its components may be adapted to execute any operating system, including Linux, UNIX, Windows, Mac OS®, Java™, Android™, or iOS. In some instances, the client 170 may comprise a computer that includes an input device, such as a keypad, touch screen, or other device(s) that can interact with the client application 176, and an output device that conveys information associated with the operation of the applications and their application windows to the user of the client 170. Such information may include digital data, visual information, or a GUI 178, as shown with respect to the client 170. Specifically, the client 170 may be any computing device operable to communicate queries or communications to the report generation system 102, other clients 170, and/or other components via network 160, as well as with the network 160 itself, using a wireline or wireless connection. In general, client 170 comprises an electronic computer device operable to receive, transmit, process, and store any appropriate data associated with the environment 100 of FIG. 1.

Client application 176 may be any suitable application, program, mobile app, or other component. As illustrated, the client application 176 interacts with the report generation system 102 via network 160. In some instances, the client application 176 may be a browser, where the functionality of the client application 176 may be realized using a web application or website the user can interact with via the client application 176. In other instances, the client application 176 may be a remote agent, component, or client-side version of the report generation system 102 or another component. In some instances, the client application 176 may interact directly with the report generation system 102 or portions thereof. The client application 176 may be used to initiate generation of a new report 134 based on a particular template 130 and set of test data 142, and may also be used to initiate a regeneration of a report 134 after identifying an issue with the underlying data 142 or based on request to update the report 134.

GUI 178 of the client 170 interfaces with at least a portion of the environment 100 for any suitable purpose, including generating a visual representation of the client application 176 and/or the content associated with any components of the report generation system 102. In particular, the GUI 178 may be used to present results of a report generation process, update or interact with one or more generated reports 134, or to otherwise interact and present information associated with one or more applications. GUI 178 may also be used to view and interact with various Web pages, applications, and Web services located local or external to the client 170. Generally, the GUI 178 provides the user with an efficient and user-friendly presentation of data provided by or communicated within the system. The GUI 178 may comprise a plurality of customizable frames or views having interactive fields, pull-down lists, and buttons operated by the user. In general, the GUI 178 is often configurable, supports a combination of tables and graphs (bar, line, pie, status dials, etc.), and is able to build real-time portals, application windows, and presentations. Therefore, the GUI 178 contemplates any suitable graphical user interface, such as a combination of a generic web browser, a web-enable application, intelligent engine, and command line interface (CLI) that processes information in the platform and efficiently presents the results to the user visually.

Memory 180 can store a plurality of reports 182 generated using the described components and applications and provided to the client 170, including report 1 184 and report n 186. Any number of reports can be stored or available at the client 170, including reports accessed via network 160 and included in the generated reports 134. In some instances, local versions of the report may be available at client 170, where users, via client application 176, can revise, annotate, and review the existing reports. Alternatively, users may be able to remotely annotate and work with generated reports 134 via the client application 176.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2A:
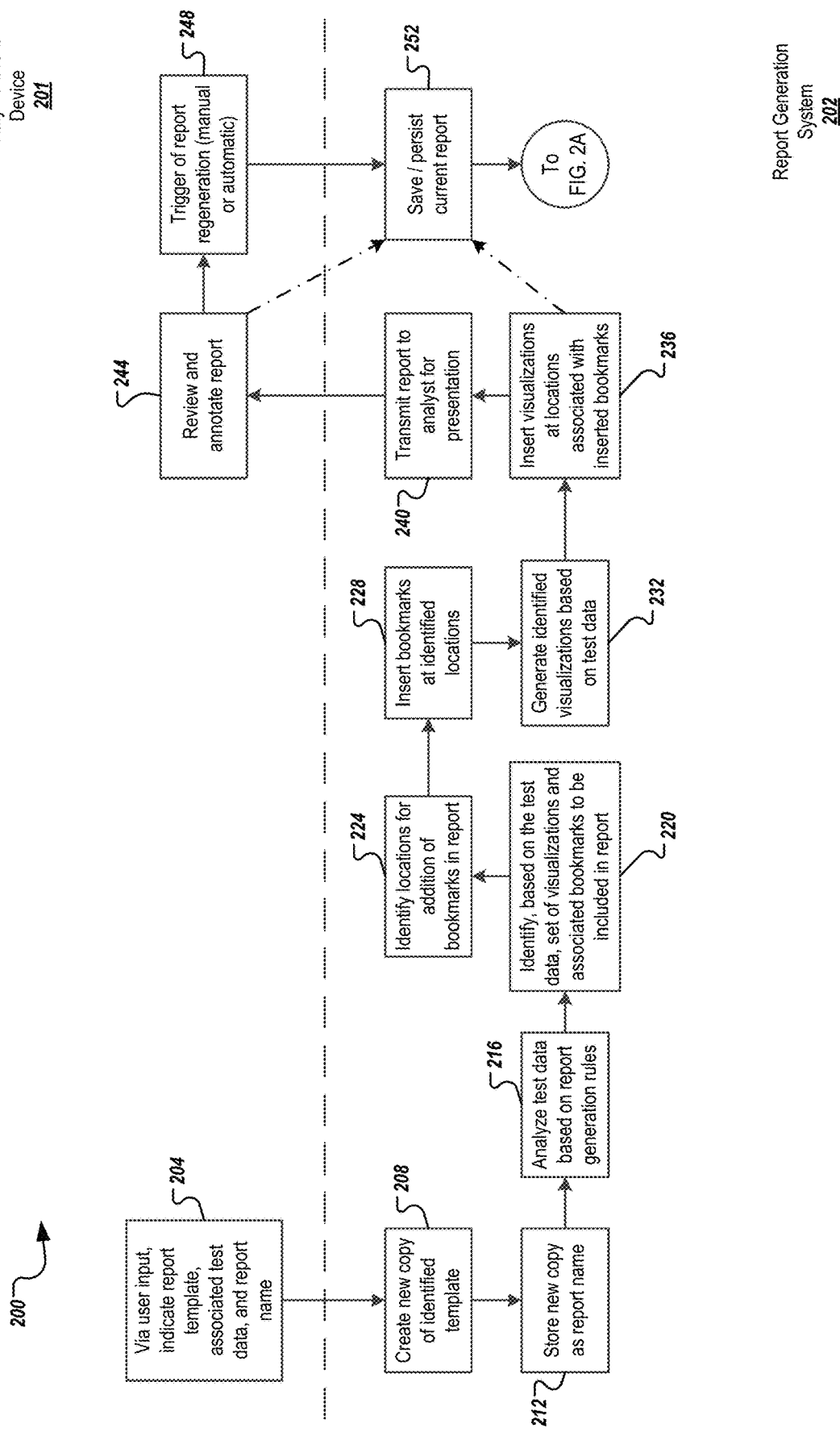
FIGS. 2A and 2B are an illustration of interactions performed in an example system for automatically generating reporting documents based on contents of an associated set of test data.
Figure 2B:
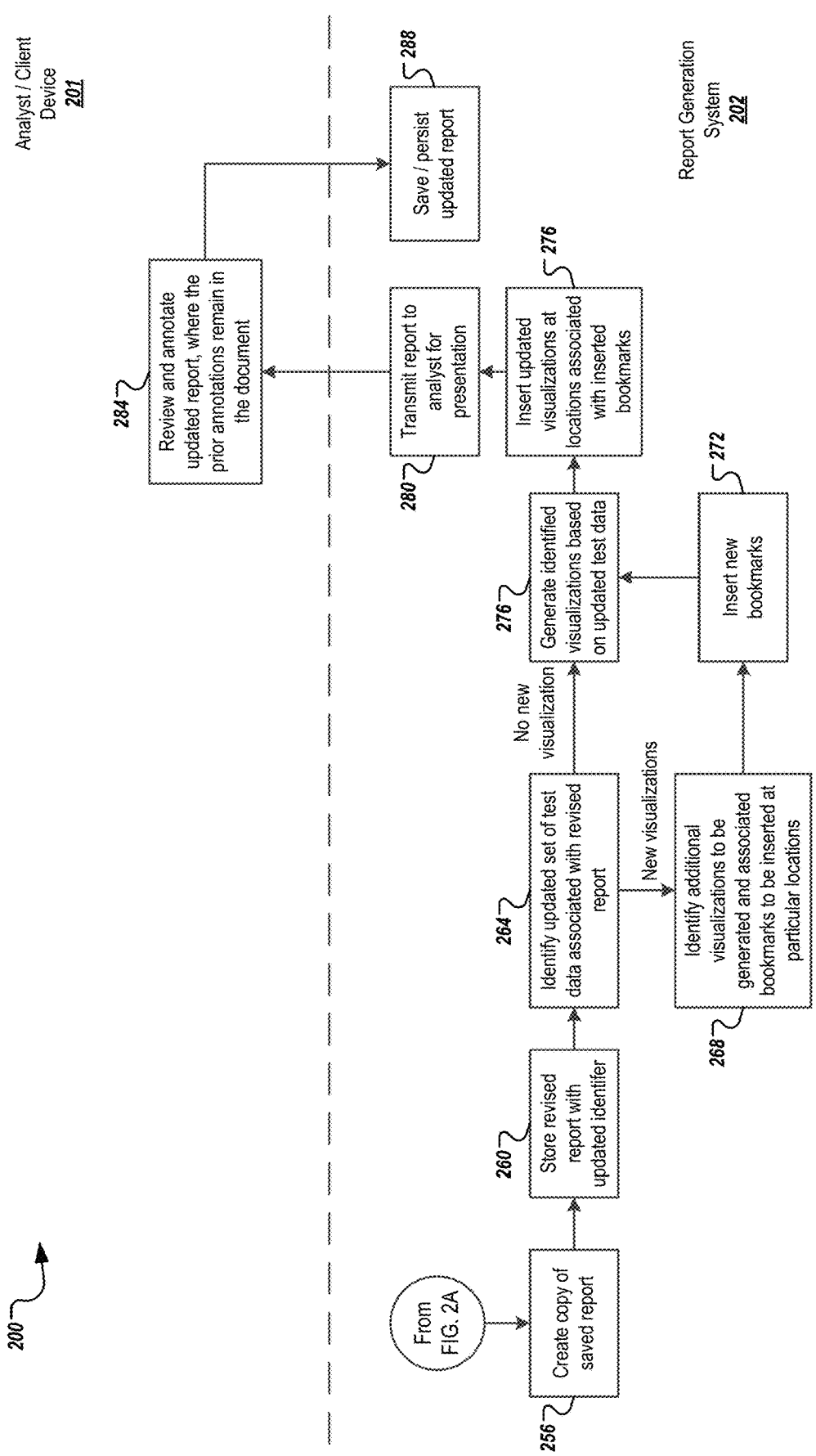

FIGS. 2A and 2B are an illustration of interactions performed in an example system for automatically generating reporting documents based on contents of an associated set of test data. Portions of the description relate to the illustration of FIG. 1, although alternative implementations may be used to perform the actions illustrated in FIGS. 2A and 2B. As illustrated, FIGS. 2A and 2B illustrate interactions between an analyst at a client device 201 and a report generation system 202.

At 204, via user input received at the client device 201, an analyst or other user may indicate a report template, a set of test data, and a report name or identifier to be used in association with generation of a report. The report template may be one of a plurality of templates available to the user, wherein some templates may be associated with different types of test data. The test data may include information associated with one or more executed models and/or calculations. The test data may be theoretical or may be based on real-world calculations. The report name may be any suitable identifier to be assigned to the generated report, and may be manually identified or automatically generated. In some instances, the set of test data identified may determine the identifier of the report, and can be combined with a date and/or time to provide further uniqueness to the identifier. The input may be associated with a report generation system 202, and the inputs can be provided to the system 202 for processing upon entry.

At 208, the report generation system 202 can create a new copy of the identified report template. The new copy, upon creation, can then be stored or otherwise persisted in memory as associated with the report identifier or name at 212. The stored report can include one or more placeholder bookmarks that were included in the selected or identified template, where each placeholder bookmark includes an identifier, such as an acronym or shortened identifier associated with a particular section of the report template.

At 216, the report generation system 202 can perform an analysis of the test data based on a set of report generation rules. The analysis may consider the name of the test data selected, the content of the test data, or the structure of the test data, as well as a combination thereof, or additional information associated with the test data. Based on the analysis, information identifying a particular set of visualizations to be generated for the report generation can be identified, where each of the set of visualizations may be associated with a particular visualization rule. In some instances, information about particular fields or columns in the data set may result in multiple visualizations being determined as to be generated, such as an index view and a detailed view of different sets of data. At 220, the visualizations and their associated bookmarks to be inserted into the generated report are identified.

At 224, locations associated with each of the bookmarks associated with a visualization to be inserted are determined within the generated report. As noted, the generated report may be associated with one or more placeholder bookmarks provided within the underlying template. Alternatively, the generated report may be prepopulated or organized with one or more sections. The placeholder bookmarks and/or the sections may be associated with names or identifiers to be used to determine where particular bookmarks associated with to-be-generated visualizations are to be located. In some instances, an identifier associated with each of the identified visualizations may be used to determine where a bookmark corresponding to the identified visualization should be placed. For example, a placeholder bookmark may be generically named "Predictive Accuracy," or may be coded as "pa_sec". For visualizations associated with a predictive accuracy-related topic, those visualizations may include a prefix "pa". When the visualizations are identified, the identifiers of those visualizations can be compared to the placeholder bookmarks to determine a relative match, indicating a particular location or section at which the generated visualization should be inserted. In some instances, the determination of where bookmarks are to be added and at which the visualizations are to be inserted may be performed by a VBA or other language script executing in or associated with the generated report.

At 228, the identified bookmarks associated with the visualizations are inserted at the identified locations. Again, the bookmarks may be inserted using an external application or script, or may be inserted using an internally executing script or code of the generated report itself.

At 232, each of the identified visualizations can be generated based on the associated test data. The visualizations may include, but are not limited to, one or more plots, tables, charts, graphs, or other suitable visualizations providing visible feedback and information about the selected or identified set of test data. The generated visualizations can then be inserted at the locations of their associated bookmarks at 236. In some instances, the generated report can be saved or persisted at 252. The report can then be transmitted to the client device 201 for presentation to the associated user or analyst at 240. In some instances, the report may be automatically transmitted once complete, while in others, the report may be made available upon an additional request.

At 244, the client device 201 may present the generated report, and in some cases, can allow the analyst or user to review and annotate the report. Annotating the report may include, but is not limited to, the addition of commentary, analysis, and/or insight to the generated report. In other words, based on the data provided in the report generation, additional context can be provided by analysts associated with the report and the underlying data set. For example, explanations, trend analysis, and predictions, among other things, can be added to the report. Additionally, sections may be added to the report, including introductions, hypotheses, and considerations, among others. Further, sections or existing text associated with the underlying template may be removed or otherwise modified. As or after annotations are added, the current report can be saved and/or persisted at 252.

At 248, a signal indicating that a report regeneration should be triggered may be received or otherwise identified. In some instances, the indication may be the result of a user's selection of a report regeneration button or other explicit request to regenerate the report based on a changed or modified set of test data. In other instances, the trigger may be performed automatically and without user input in response to a determination that the test data used to generate the initial report has changed, been updated, or been otherwise modified. These changes may be caused based on corrections performed on the test data, such as where an erroneous calculation or value is identified and modifications are made directly to the test data. In other instances, such as where data is updated periodically, in response to particular events, or based on user interactions or other external factors, the modifications and changes to the test data may occur as new data is available. If the report has not already been saved, the report generation system 202 can perform the save or persist operations at 252.

At 256, a copy of the existing report is created to create a revised report, and at 260, the revised report is stored with an updated name or identifier. In some instances, the name of the prior report may be used along with a version identifier, which may identify a revision number, a date or time of the creation of the revised report, or any other suitable identifier. In some instances, the name or identifier may be significantly different from the prior report, while in others, the name or identifier may be significantly similar.

Once saved, at 264 the updated set of test data associated with the revised report is identified. In some instances, the updated set of test data may include one or more additional columns and/or data points, a revised structure, or a revised name or identifier. Based on the visualization rules, a determination can be made as to whether any new visualizations not included in the prior report are to be generated, or whether only a similar set of visualizations regenerated based on the updated data set are to be included. If one or more new visualizations are to be generated, method 200 continues at 268, where the additional visualizations to be generated are identified, and where locations for bookmarks associated with those additional visualizations are identified at particular locations within the revised report. At 272, the new bookmarks can be inserted into the revised report. Method 200 can then continue at 276. If, however, no new visualizations are determined to be needed for the revised report, method 200 can continue to 276.

At 276, the identified visualizations are generated based on the updated set of test data. Once generated, those generated visualizations can be inserted at the locations associated with the corresponding bookmarks. In combination with the insertion, any previously inserted visualizations are removed or erased prior to the insertion of the updated visualizations. The bookmarks associated with the prior visualizations may be kept and used as the bookmarks at which the corresponding updated visualizations are to be inserted. Because only the prior visualizations associated with the bookmarks are to be removed, any annotations provided by the analyst at 244 prior to the regeneration request can be provided by and included in the revised report, thereby avoiding the need of analysts to fully rework and revise their commentary and additions to the revised report when the underlying data set is modified or updated.

At 280, the revised report can be saved and/or transmitted to the client device 201 for presentation. At 284, the analyst can, at the client device 201 review and annotate the updated report, as needed, with any prior annotations remaining within the revised report. Those prior annotations may be fully editable in the revised report, and can be deleted, added to, or modified by the analyst. Once those annotations are complete, the report can be saved or persisted at 288. Any number of future regenerations may be performed, with a similar process being performed for regeneration of the report.

Figure 3:
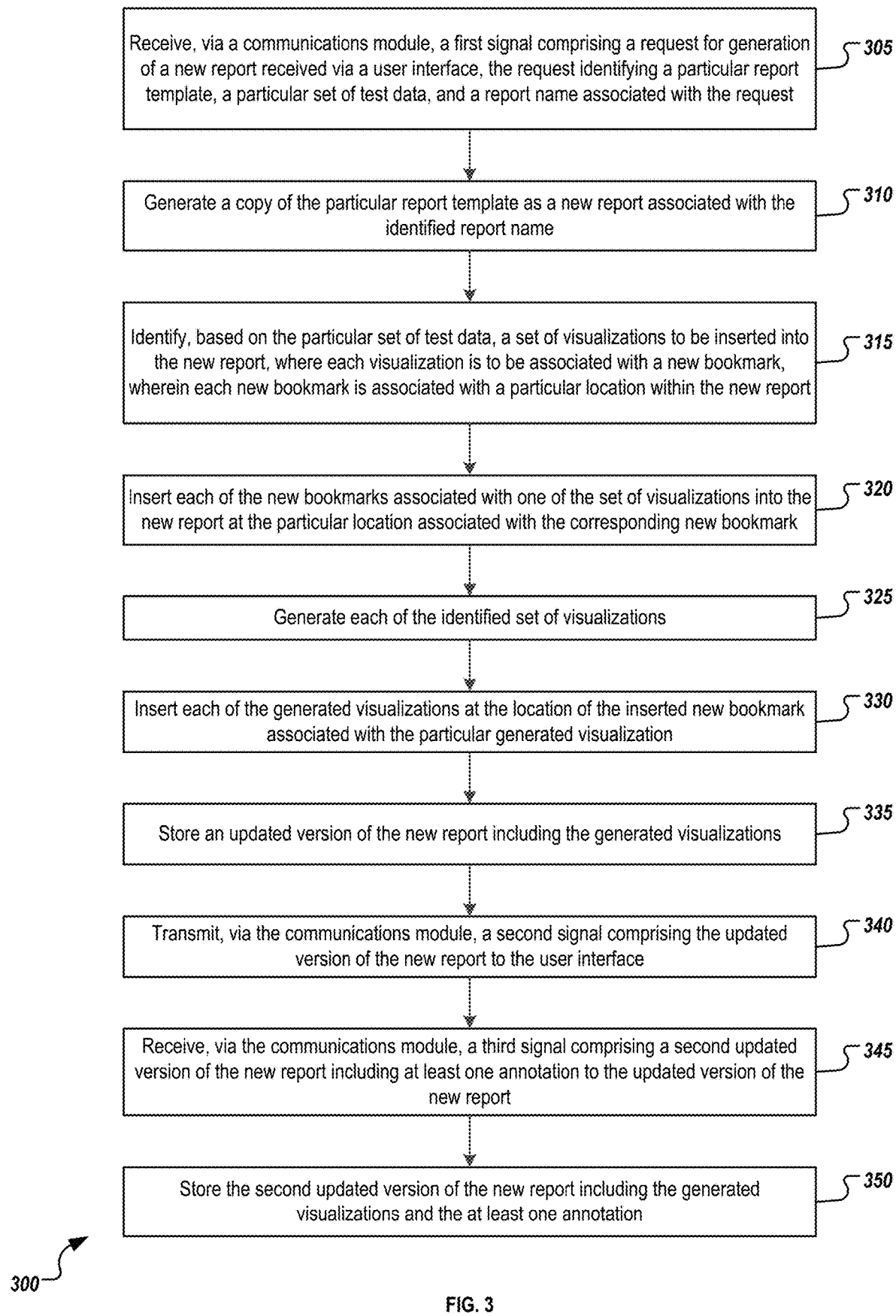
FIG. 3 is a flow diagram of an example method for automatically generating reporting documents based on contents of an associated set of test data in one example implementation.

FIG. 3 is a flow diagram of an example method for automatically generating reporting documents based on contents of an associated set of test data in one example implementation. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate. In some instances, method 300 can be performed by the report generation system 102, or portions thereof, described in FIG. 1, as well as other components or functionality described in other portions of this description.

At 305, a first signal is received via a communications module. The first signal can include or comprise a request for generation of a new report received via a user interface. The request itself can include or identify a particular report template upon which the new report is to be based, a particular set of test data that is to be associated with the new report, and a report name associated with the request. In some instances, the report name may be automatically generated, such as based at least in part on a date or time of the request. The particular report template may be one of a plurality of report templates, where each report template is associated with or includes an initial set of bookmarks representing placeholders for future sections, visualizations, or other information. Each of the initial set of bookmarks may be associated with or placed at a location within the corresponding report template.

At 310, a copy of the particular identified report template can be generated as a new report, and can be saved or associated with the report name associated with the request. The copy can include any placeholder or existing set of bookmarks from the report template. In many instances, the copy may be an exact replica of the selected or identified report template, while in others, the copy may modify portions of the report template, such as headers, titles, and other non-material portions of the report template. In some instances, additional portions of the new report may be generated other than any new bookmarks and visualizations.

At 315, operations may be performed to identify, based at least in part on the particular set of test data, a set of one or more visualizations to be inserted into the new report. For each identified visualization, a new bookmark to be inserted into the new report can be associated and identified, where each of the new bookmarks are associated with a particular location in the new report. In some instances, the particular set of visualizations to be inserted may be determined based on a name or identifier associated with the particular set of data. For example, if files storing the set of data have a known name or name format, a corresponding set of visualizations may be identified. For example, a dataset named "pd_roc_exp" may be saved. The program or application knows that the user is performed an ROC test for a PD model for explanatory reasons. The combination of ROC test, PD model, and explanatory reasons may be associated with or correspond to a particular type of plot and/or a certain type of table that is to be generated. Alternatively, or additionally, a format of the data itself, including but not limited to one or more fields, columns, rows, or combination thereof, within the set of test data may identify the particular visualizations to be generated. For example, where a combination of fields X, Y, and Z are included in the set of test data, one or more particular visualizations may be identified based on that combination of fields. Similarly, one or more visualizations may be also or instead identified corresponding to a subcombination or individual fields. The particular visualizations may be determined by applying one or more visualization rules, which may be analyzed by a specific application or script during the report generation operations.

Figure 5A:
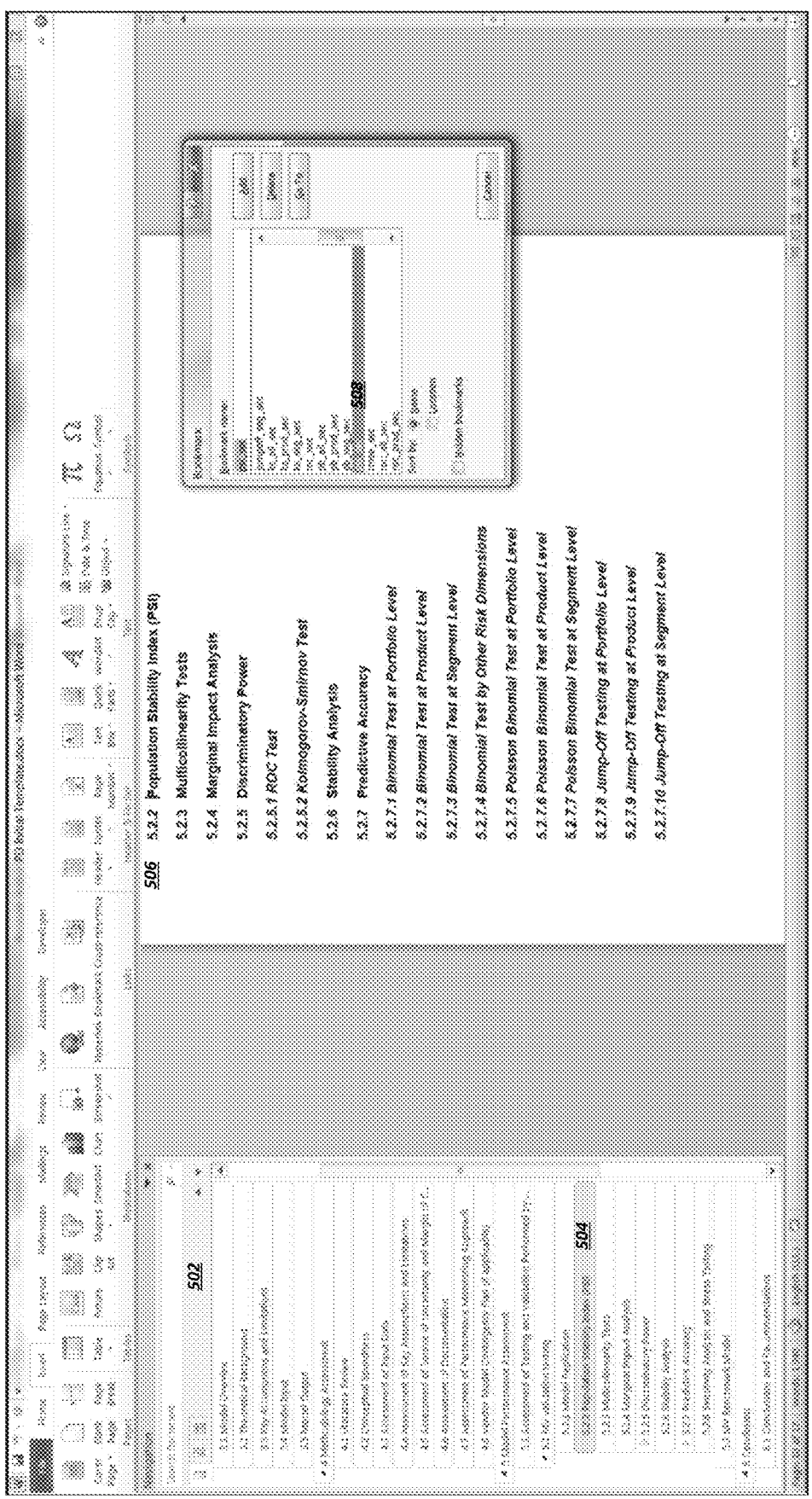
Figure 5B:
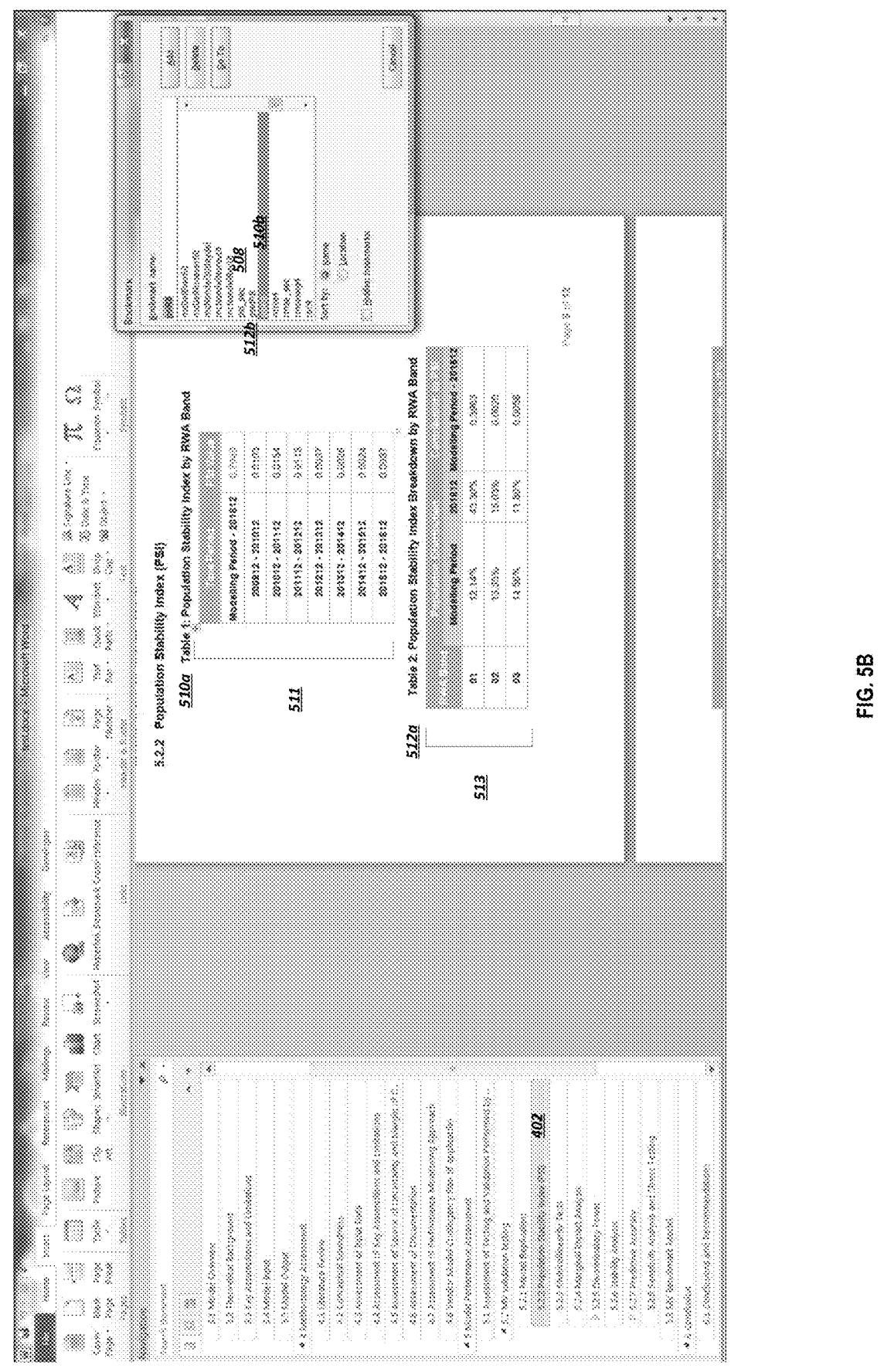

At 320, each of the new bookmarks associated with a particular identified visualization to be included can be inserted into a respective position within the new report. The locations at which the new bookmarks are to be added may be determined by one or more bookmark rules. In some instances, the bookmark rules may identify a particular absolute location within the new report where the bookmark is to be placed. In other instances, the bookmark rules may identify a particular relative location within the new report to be inserted. In some instances, that relative position may be based on and relative to one or more of the initial or existing set of bookmarks included in the new report from the report template. For example, and as illustrated in FIG. 5A, a report template may include a plurality of sections 502, with those sections each associated with a corresponding bookmark in the report template. For example, section 5.2.2 (504) is illustrated in the section listing 502, corresponds to text relates to Population Stability Index (PSI) information 506, and is initially associated with a bookmark named "psi_sec" 508. When the new bookmarks "psiRB" 510*b* and "psidRB" 512*b* are added to the new report as shown in FIG. 5B (at 510*a* and 510*b*, respectively), they are added next to and following the original "psi_sec" bookmark 508.

At 325, each of the identified set of visualizations can be generated. In some instances, the visualizations can be generated in parallel, in series, or in a combination thereof. The visualizations may be any suitable visualization of at least a portion of the identified set of test data, and can include, but is not limited to, an image, a chart, a graph, or a picture. In some instances, a portion of a spreadsheet or table may be generated as determined at 315. Once generated, each of the generated visualizations can be inserted at the location of the inserted new bookmark associated with the particular generated visualization at 330. In some instances, a dedicated script or application may perform those operations (i.e., visualization generation and insertion), and may be different than the script or application that inserted the new bookmarks into the new report. In some instances, different scripts or applications may perform the generation and insertion operations, as well. As illustrated in FIG. 5B, two tables 511 and 513 are generated, along with a corresponding caption for each table 511, 513. Those tables 511, 513 are then inserted at the locations of their corresponding new bookmarks 510*a* and 512*a*.

At 335, an updated version of the new report can be stored, where the updated version of the new report can replace the copy generated at 310, and can include the generated visualizations inserted at the locations of their corresponding new bookmarks.

At 340, in response to completing the initial generation of the new report, a second signal comprising the updated version of the new report can be transmitted, via the communications module, to the user interface at which the new report was requested. In some instances, an indication that the new report is available may be sent instead, where a user can then request to view or interact with the new report at the user interface. Any suitable presentation of the new report can be provided, including via a web-based interface or where the new report is made available to the user at the user interface to a local copy. Any changes to the new report by the user can then be saved and checked back in to replace the persisted or stored version.

In some instances, a third signal comprising a second updated version of the new report may be received via the communications module, where the second updated version of the new report includes the updated version of the new report transmitted at 340 along with at least one annotation or other modification received at the user interface. The second updated version of the new report can be stored at 350 with an identical identifier or name, and can replace the earlier version stored at 335. The second updated version of the new report can include the generated visualizations included in the updated version of the new report and the corresponding bookmarks, along with any annotations added, for example, by an analyst reviewing the generated report. In some instances, the second updated version of the new report may reflect one or more portions removed from the updated version of the new report, including one or more visualizations and, in some instances, the corresponding bookmarks.

Figure 4:
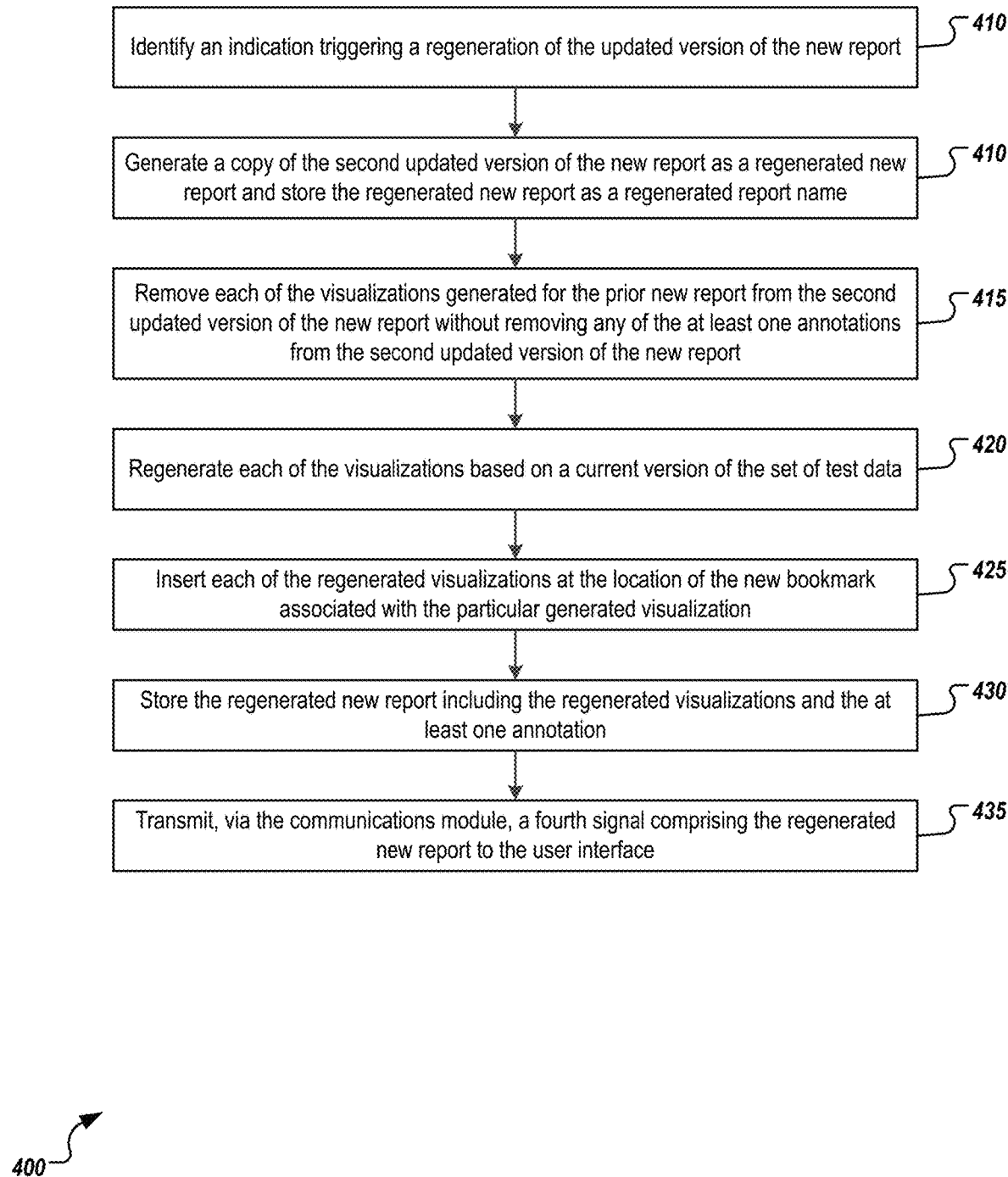
FIG. 4 is a flow diagram of an example method for automatically regenerating reporting documents based on contents of an associated set of test data without modification to any annotations applied to a prior version of the reporting document in one example implementation.

FIG. 4 is a flow diagram of an example method 400 for automatically regenerating reporting documents based on contents of an associated set of test data without modification to any annotations applied to a prior version of the reporting document in one example implementation. For clarity of presentation, the description that follows generally describes method 400 in the context of the system 100 illustrated in FIG. 1. However, it will be understood that method 400 may be performed, for example, by any other suitable system, environment, software, and hardware, or a combination of systems, environments, software, and hardware as appropriate. In some instances, method 300 can be performed by the report generation system 102, or portions thereof, described in FIG. 1, as well as other components or functionality described in other portions of this description. Further, method 400 may, in some instances, follow directly from method 300 of FIG. 3.

At 410, an indication may be identified that triggers a regeneration of an updated version of a new report previously generated. In some instances, the updated version may be a version of the report including one or more annotations from an analyst or other user (e.g., after 350 of FIG. 3), while in other instances, the updated version may be a version previously generated without any added annotations or modifications made (e.g., available after 335 of FIG. 3). The indication may be received via a signal received via the communications module in response to manual indication for regeneration received from the user interacting with a user interface where the current version of the report is available, such as when an issue or problem with the initial data set is identified, or where a new set of data may replace or otherwise update the prior set of test data used to generate the previous report. In other instances, identifying the indication triggering the regeneration may be based on a dynamic determination that the identified set of test data associated with the current report has been updated or changed. In some instances, sets of test data may be monitored by an agent or other component, and, in response to dynamically detecting a change to the set of test data, the trigger for regeneration could be generated.

At 410, a copy of the most recent version of the new report (e.g., the second updated version of the new report if method 300 occurs immediately prior to 410) can be generated and stored as a regenerated new report. The regenerated new report can be stored and associated with a regenerated report name, which may be automatically generated (e.g., using an updated timestamp, date, or version information appended to the prior name or identifier) or manually provided in response to the trigger.

At 415, each of the visualizations generated for the prior version of the report are removed from the regenerated version of the report. In some instances, the corresponding bookmarks from the prior version can be maintained and used to identify where to place the to-be-generated visualizations in the regenerated version. In some instances, one or more additional visualizations may be identified to be included in the regenerated version of the report based on an analysis of the current version of the set of test data associated with the regeneration. In those instances, after removing the prior visualizations, one or more additional new bookmarks can be added to the regenerated version and placed at their appropriate locations.

At 420, each of the visualizations can then be regenerated based on the current version of the set of test data as modified since the prior report generation process. Once generated, the new visualizations can then each be inserted at the location of the corresponding bookmark associated with the prior and now-deleted visualization. Any related or surrounding annotations, however, will remain from the prior version, allowing any notes, commentary, and other changes to the prior report to be maintained within the regenerated version.

At 430, the regenerated new report is stored, with the regenerated new report including the regenerated visualizations and the at least one annotations from the prior version. The regenerated visualizations replace the prior visualizations and reflect the current set of data, while retaining the formatting and organization of the prior version.

Once stored, or in combination with storing, a fourth signal comprising the regenerated new report can be transmitted via the communications module to the user interface. If, after additional annotations are received, another regeneration request is received, method 400 can begin again. The regenerated new report can be used as the initial template in a new iteration of method 400, and can allow a further updated data set to be reflected in an updated regenerated version of the report. Similar to these operations, any annotations added after the prior generation can be maintained, and a revised set of visualizations can be included in the updated regenerated report.

FIG. 5C illustrates an example of the changes made in a regenerated version of the report generated in FIG. 5B. As described, the underlying set of test data was updated after the initial generation of the report illustrated in FIG. 5B. After the regeneration was triggered, new visualizations were generated and placed at the bookmarks associated with the original visualizations. While the bookmarks 510*a* and 512*a* remain in the same location, the updated visualizations 521 and 523 have been created and inserted at those bookmarks 510*a*, 512*a*, respectively. In comparing the visualizations from the two versions, the values of the visualizations have changed over time, although the same visualizations are generated and inserted.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   a communications module;
   at least one memory storing instructions, a repository storing a plurality of sets of test data, at least one report template, each report template associated with an initial set of bookmarks, each bookmark of the initial set of bookmarks associated with a location within the corresponding report template;
   at least one hardware processor interoperably coupled with the at least one memory and the communications module, wherein the instructions instruct the at least one hardware processor to:
   receive, via the communications module, a first signal comprising a request for generation of a new report received via a user interface operating on a device, the request identifying a particular report template, a particular set of test data, and a report name associated with a request for report generation;
   automatically, in response to receiving the request:
      generate a copy of the particular report template as a new report and store the new report as the identified report name;
      insert one or more generated visualizations at one or more locations of one or more new bookmarks associated with the generated visualizations; and
      store an updated version of the new report including the one or more generated visualizations and at least one annotation, wherein the at least one annotation is received from a user after the insertion of the one or more generated visualizations, and wherein each annotation is associated with and located at a location relative to a particular generated visualization;
   identify an indication triggering a regeneration of the updated version of the new report;
   automatically, in response to the indication:
      generate a copy of the updated version of the new report as a regenerated new report and store the regenerated new report as associated with a regenerated report name;
      remove each of the one or more visualizations generated for the updated version of the new report from the updated version of the new report, wherein removing each of the one or more visualizations does not affect the location or values of each of the at least one annotations from the updated version of the new report;
      regenerate each of the visualizations based on a current version of the set of test data;
      insert each of the regenerated visualizations into the regenerated new report at the respective location of the bookmark associated with the particular generated visualization, wherein each of the at least one annotations stored in the updated version of the new report remain unchanged after insertion of the corresponding regenerated visualization and at a same location relative to the regenerated visualization associated with the particular removed visualization; and
      store the regenerated new report including the regenerated visualizations and the at least one annotation; and
   transmit, via the communications module, a second signal comprising the regenerated new report to the device.

2. The system of claim 1, wherein identifying the indication triggering a regeneration of the updated version of the new report is based on a dynamic determination that the identified set of test data is updated.

3. The system of claim 2, wherein the dynamic determination comprises monitoring the identified set of test data to determine whether the identified set of test data has been updated or modified since the updated version of the new report was stored.

4. The system of claim 1, wherein identifying the indication triggering a regeneration of the updated version of the new report is based on receiving an indication via the user interface from a user to regenerate the new report.

5. The system of claim 1, wherein the visualizations comprise at least one of an image, a chart, a graph, or a picture.

6. The system of claim 1, wherein non-bookmark and non-visualization portions are maintained in the regenerated new report.

7. The system of claim 1, wherein regeneration of each of the visualizations based on the current version of the set of test data is performed after the current version of the set of test data is provided in a separate file.

8. The system of claim 1, wherein regeneration of each of the visualizations based on the current version of the set of test data is performed after an indication that a file containing test data has been updated to include the current version of the set of test data, wherein the file is used for regeneration.

9. The system of claim 1, wherein one or more additional visualizations and one or more corresponding additional bookmarks are generated based on the current version of the set of test data, and wherein the one or more additional visualizations are inserted and stored in the regenerated new report.

10. The system of claim 1, wherein the regenerated report name comprises the identified report name and an indication of a version or date.

11. A non-transitory, computer-readable medium storing computer-readable instructions executable by a computer and configured to:
receive, via a communications module, a first signal comprising a request for generation of a new report received via a user interface operating on a device, the request identifying a particular report template, a particular set of test data, and a report name associated with a request for report generation from a repository, the repository storing a plurality of sets of test data and at least one report template, each report template associated with an initial set of bookmarks, each bookmark of the initial set of bookmarks associated with a location within the corresponding report template;
automatically, in response to receiving the request:
generate a copy of the particular report template as a new report and store the new report as the identified report name;
insert one or more generated visualizations at one or more locations of one or more new bookmarks associated with the generated visualizations; and
store an updated version of the new report including the one or more generated visualizations and at least one annotation, wherein the at least one annotation is received from a user after the insertion of the one or more generated visualizations, and wherein each annotation is associated with and located at a location relative to a particular generated visualization;
identify an indication triggering a regeneration of the updated version of the new report;
automatically, in response to the indication:
generate a copy of the updated version of the new report as a regenerated new report and store the regenerated new report as associated with a regenerated report name;
remove each of the one or more visualizations generated for the updated version of the new report from the updated version of the new report, wherein removing each of the one or more visualizations does not affect the location or values of each of the at least one annotations from the updated version of the new report;
regenerate each of the visualizations based on a current version of the set of test data;
insert each of the regenerated visualizations into the regenerated new report at the respective location of the bookmark associated with the particular generated visualization, wherein each of the at least one annotations stored in the updated version of the new report remain unchanged after insertion of the corresponding regenerated visualization and at a same location relative to the regenerated visualization associated with the particular removed visualization; and
store the regenerated new report including the regenerated visualizations and the at least one annotation; and
transmit, via the communications module, a second signal comprising the regenerated new report to the device.

12. The computer-readable medium of claim 11, wherein identifying the indication triggering a regeneration of the updated version of the new report is based on a dynamic determination that the identified set of test data is updated.

13. The computer-readable medium of claim 12, wherein the dynamic determination comprises monitoring the identified set of test data to determine whether the identified set of test data has been updated or modified since the updated version of the new report was stored.

14. The computer-readable medium of claim 13, wherein identifying the indication triggering a regeneration of the updated version of the new report is based on receiving an indication via the user interface from a user to regenerate the new report.

15. The computer-readable medium of claim 13, wherein regeneration of each of the visualizations based on the current version of the set of test data is performed after the current version of the set of test data is provided in a separate file.

16. The computer-readable medium of claim 11, wherein regeneration of each of the visualizations based on the current version of the set of test data is performed after an indication that a file containing test data has been updated to include the current version of the set of test data, wherein the file is used for regeneration.

17. The computer-readable medium of claim 11, wherein one or more additional visualizations and one or more corresponding additional bookmarks are generated based on the current version of the set of test data, and wherein the one or more additional visualizations are inserted and stored in the regenerated new report.

18. A computerized method performed by one or more processors, the method comprising:
receiving, via a communications module, a first signal comprising a request for generation of a new report received via a user interface operating on a device, the request identifying a particular report template, a particular set of test data, and a report name associated with a request for report generation from a repository, the repository storing a plurality of sets of test data and at least one report template, each report template associated with an initial set of bookmarks, each bookmark of the initial set of bookmarks associated with a location within the corresponding report template;
automatically, in response to receiving the request:

generating a copy of the particular report template as a new report and store the new report as the identified report name;

inserting one or more generated visualizations at one or more locations of one or more new bookmarks associated with the generated visualizations; and storing an updated version of the new report including the one or more generated visualizations and at least one annotation, wherein the at least one annotation is received from a user after the insertion of the one or more generated visualizations, and wherein each annotation is associated with and located at a location relative to a particular generated visualization;

identifying an indication triggering a regeneration of the updated version of the new report;

automatically, in response to the indication:

generating a copy of the updated version of the new report as a regenerated new report and store the regenerated new report as associated with a regenerated report name;

removing each of the one or more visualizations generated for the updated version of the new report from the updated version of the new report, wherein removing each of the one or more visualizations does not affect the location or values of each of the at least one annotations from the updated version of the new report;

regenerating each of the visualizations based on a current version of the set of test data;

inserting each of the regenerated visualizations into the regenerated new report at the respective location of the bookmark associated with the particular generated visualization, wherein each of the at least one annotations stored in the updated version of the new report remain unchanged after insertion of the corresponding regenerated visualization and at a same location relative to the regenerated visualization associated with the particular removed visualization; and storing the regenerated new report including the regenerated visualizations and the at least one annotation; and transmitting, via the communications module, a second signal comprising the regenerated new report to the device.

19. The method of claim 18, wherein identifying the indication triggering a regeneration of the updated version of the new report is based on a dynamic determination that the identified set of test data is updated.

20. The method of claim 18, wherein identifying the indication triggering a regeneration of the updated version of the new report is based on receiving an indication via the user interface from a user to regenerate the new report.

* * * * *